(12) United States Patent
Dellevigne et al.

(10) Patent No.: US 7,857,937 B2
(45) Date of Patent: Dec. 28, 2010

(54) THERMOSETTING HOT-MELT POLYURETHANE ADHESIVE FOR LABELING A STRUCTURE

(75) Inventors: Laura Dellevigne, Danbury, CT (US); Jeffrey T. Sloat, Broomfield, CO (US)

(73) Assignee: PepsiCo, Inc., Purchase, NY (US)

(*) Notice: Subject to any disclaimer, the term of this patent is extended or adjusted under 35 U.S.C. 154(b) by 325 days.

(21) Appl. No.: 11/950,774

(22) Filed: Dec. 5, 2007

(65) Prior Publication Data

US 2009/0145550 A1    Jun. 11, 2009

(51) Int. Cl.
*B65C 3/08* (2006.01)

(52) U.S. Cl. .................. 156/291; 156/86; 156/290; 156/314

(58) Field of Classification Search ............ 156/86, 156/196, 291, 290, 314
See application file for complete search history.

(56) References Cited

U.S. PATENT DOCUMENTS

| | | | |
|---|---|---|---|
| 4,999,407 A | | 3/1991 | Gilch et al. |
| 5,021,507 A | | 6/1991 | Stanley et al. |
| 5,252,155 A | | 10/1993 | Nowicki et al. |
| 5,324,078 A | * | 6/1994 | Bane .................. 283/81 |
| 5,538,575 A | | 7/1996 | Hinton |
| 5,897,722 A | * | 4/1999 | Bright .................. 156/86 |
| 5,932,680 A | | 8/1999 | Heider |
| 6,133,400 A | | 10/2000 | Helmeke |
| 6,221,978 B1 | | 4/2001 | Li et al. |
| 7,138,466 B2 | | 11/2006 | Hung et al. |
| 2005/0176872 A1 | | 8/2005 | Martin et al. |
| 2006/0084755 A1 | | 4/2006 | Good et al. |
| 2006/0205909 A1 | | 9/2006 | O'Brien |
| 2007/0155859 A1 | | 7/2007 | Song et al. |
| 2007/0172669 A1 | | 7/2007 | Amon et al. |

FOREIGN PATENT DOCUMENTS

| | | |
|---|---|---|
| EP | 560211 A1 * | 9/1993 |
| EP | 1283511 A2 | 2/2003 |
| GB | 2154900 A | 9/1985 |
| JP | 2005126595 A | 5/2005 |
| WO | WO 9408781 A1 * | 4/1994 |

OTHER PUBLICATIONS

International Search Report mailed Mar. 4, 2009 for PCT/US2008/082313.
Waites, P. Moisture-curing reactive polyurethane hot-melt adhesives Pigment & Resin Technology, 26:5, 1997, pp. 300-303.
K. Albers, et al., "Advanced reactive polyurethane hot melt adhesives for high-performance textile laminates and industrial composites," vol. 46, Mar. 2003, pp. E32 to E33.
P. Ambrovic et al, Thermische Stabilitat, Kunststoffe German Plastics 81 (1991) 11, pp. 1036-1037.

* cited by examiner

*Primary Examiner*—Jeff H Aftergut
*Assistant Examiner*—Jaeyun Lee
(74) *Attorney, Agent, or Firm*—Banner & Witcoff, Ltd.

(57) ABSTRACT

A process for affixing an insulating label to a container involves applying a thermoplastic hot-melt adhesive to a first edge of the label and applying a thermoplastic hot-melt adhesive and a thermosetting adhesive to a second edge of the label. The insulating label is applied to a container, and provides improved heat resistance, thereby reducing occurrences of delamination during subsequent heating of the container.

20 Claims, 2 Drawing Sheets

THERMOSETTING HOT-MELT POLYURETHANE ADHESIVE FOR LABELING A STRUCTURE

DESCRIPTION OF RELATED ART

Insulating labels have been developed for insulating containers for hot beverages while protecting the consumer from burns. One current label utilizes a polymeric film that is extrusion laminated to a non-woven polyolefin insulation layer. The label can be supplied in roll form and applied to containers, such as 9 oz. steel cans, using a Krones Contiroll labeler or similar labeling equipment. A low viscosity (e.g., 400-1200 cPs) hot-melt thermoplastic adhesive is used to affix the label to the container. One disadvantage is that the hot-melt adhesive is prone to re-softening when the beverage is heated in a suitable heating apparatus. The softening of the adhesive can result in the label becoming separated from the container, thereby compromising package integrity as well as its insulating and safety properties.

Another type of insulating label is prepared by oriented polystyrene foam/polystyrene film lamination. A reverse-printed polystyrene film is adhesive laminated to a foamed polystyrene insulation layer. The structure is typically supplied in roll format and applied to containers using a Krones Contiroll labeler or similar labeling equipment. Instead of using a hot-melt adhesive, the polystyrene label is solvent-welded together. A solvent is applied to the lap portion of the label during labeling and the solvent dissolves the polystyrene polymer. The label is then seamed together where the dissolved polystyrene resin welds the two sides of the label together, thereby creating a seam without the use of glue. However, the overall heat resistance of the polystyrene label is poor, resulting in label melting and "burn-through" during heating.

It would be advantageous to have a process for labeling a structure with an insulating label having improved heat resistance properties, for example to reduce the likelihood of delamination upon subsequent heating of the structure and/or label.

SUMMARY

In one aspect, a process for affixing a label having a first edge and a second edge to a container is provided. A thermoplastic hot-melt adhesive is applied to the first edge. A thermoplastic hot-melt adhesive and a thermosetting adhesive are applied to the second edge. The process may involve applying the thermoplastic hot-melt adhesive in at least two separate locations of the second edge and applying the thermosetting adhesive in at least one location of the second edge that does not comprise the thermoplastic hot-melt adhesive. The label is affixed to the container.

DETAILED DESCRIPTION OF THE INVENTION

Figure 1:
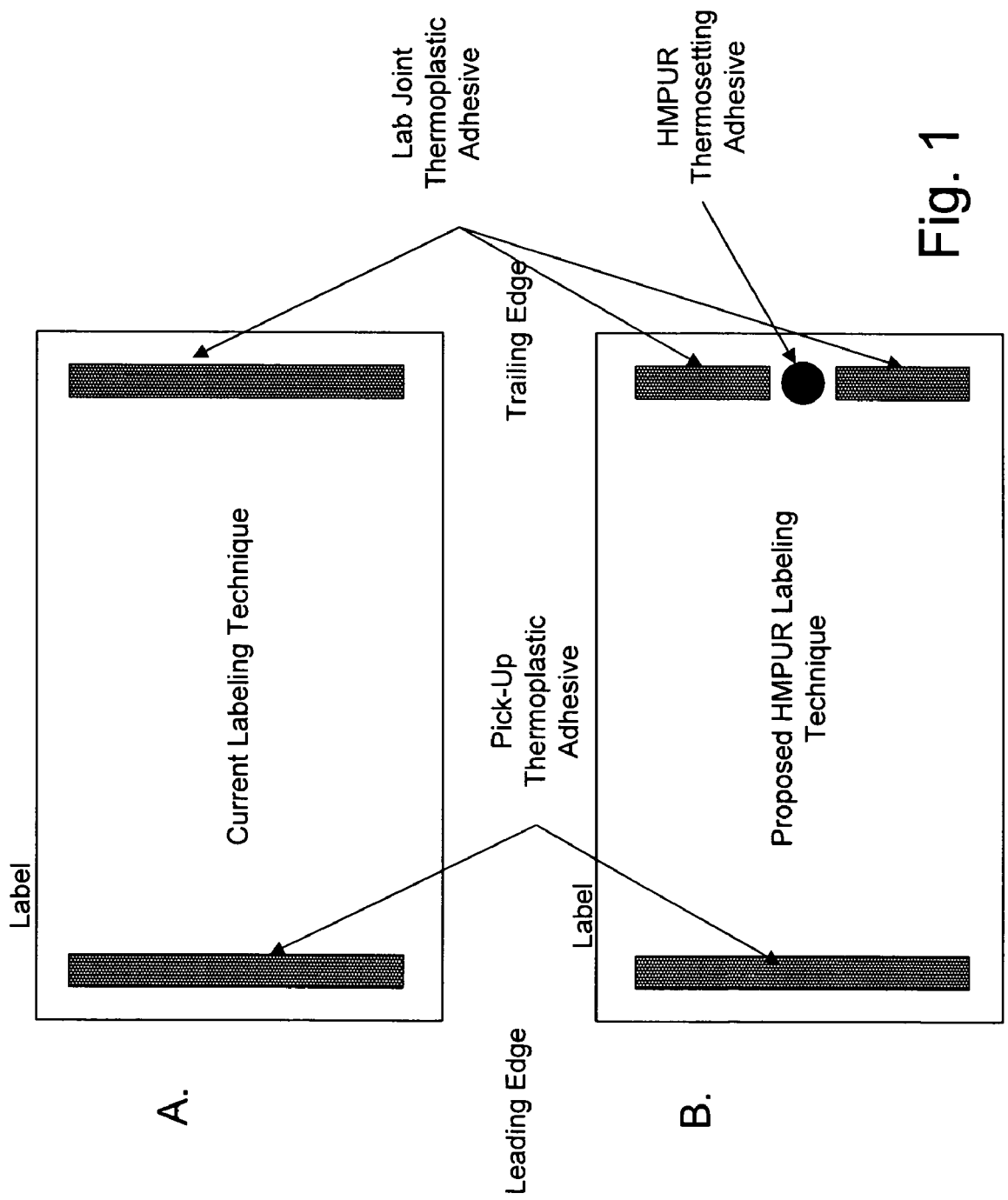
FIG. 1 is a diagram showing an example of the placement of thermosetting and thermoplastic adhesives on a label.

As used herein, the term "thermoplastic adhesive" and similar terms refer to adhesives that soften or melt to a liquid when heated. The term "thermosetting adhesive" refers to polymer material that is capable of curing to form a cross-linked structure, resulting in an adhesive with a higher melting point. Examples of thermosetting adhesives include moisture-curing polyurethane reactive adhesives, which are efficient, high performance adhesives for a wide range of applications. One specific class of moisture-curing polyurethane reactive adhesives are commonly referred to as hot-melt polyurethane reactive adhesives (sometimes abbreviated "HMPUR" or "PUR").

The process is not limited to any particular type of thermosetting adhesive. Non-limiting examples of thermosetting adhesives include moisture curable polyurethane adhesives, 2-part polyurethane adhesives produced by the combination of an isocyanate with a suitable polyol, 2-part epoxy systems having an epoxide containing resin mixed with a active hydrogen containing hardening agent, or moisture curable cyanoacrylate adhesives to name a few. In particular, a moisture curable polyurethane hot-melt adhesive may be used. These adhesives are composed predominantly of polymeric isocyanate resins that have been constructed from the reaction of polyols with an excess of polyisocyanate monomer. Typical polyols would include polyester and/or polyether polyols, where typical polyisocyanate monomers would include compounds such as methylenediphenyl diisocyanate, toluene diisocyanate, or isophorone diisocyanate. Many types of thermosetting adhesives are well known in the art. Reference is made to U.S. Pat. Nos. 6,133,400, 5,932,680, 6,221,978, 5,018,337, and 4,999,407, and published applications U.S. 2007/0155859 and US 2006/0205909, the disclosures of which are hereby incorporated by reference.

The HMPUR adhesion reaction occurs in primarily two stages. The first is similar to a conventional hot melt and involves cooling the molten adhesive to a solid. The second stage occurs as the adhesive reacts with moisture from the atmosphere and/or the substrate, which produces a high temperature resistant polymer. HMPUR adhesives generally can withstand temperatures up to 250° F. and short term exposure temperatures up to 400° F. See Waites, P. Moisture-curing reactive polyurethane hot-melt adhesives Pigment & Resin Technology, 26:5, 1997, pp. 300-303. The outstanding heat resistance makes HMPUR an ideal adhesive candidate for affixing an insulating label to a container that will be subjected to heating.

Affixing a label to a container may be desired for several reasons. A label may have insulating properties and/or may provide aesthetic and/or informational purposes. The label is preferably made of a heat-stable film or material that can maintain its structure during exposure to high temperatures. Materials such as heat-shrinkable films are poor candidates for such applications and generally should be avoided. The container to be labeled may be made of a high temperature resistant plastic, a metal, glass, a composite material, or any other suitable material. The container may be a can, a bottle or any other storage means.

In one aspect, a thermoplastic hot melt adhesive is applied to the leading edge and the trailing edge of the label. The leading edge is the edge of the label which will first come in contact with the container. The trailing edge is the opposite edge of the label. The leading edge of the label may come directly in contact with the container and may adhere directly to the surface of the container. The container may then be spun causing the label to wrap around the container. Once wrapping is complete, the trailing edge of the label lays on top of the already adhered leading edge (forming the lap joint), thereby producing a fully wrapped and bonded container.

Figure 2:
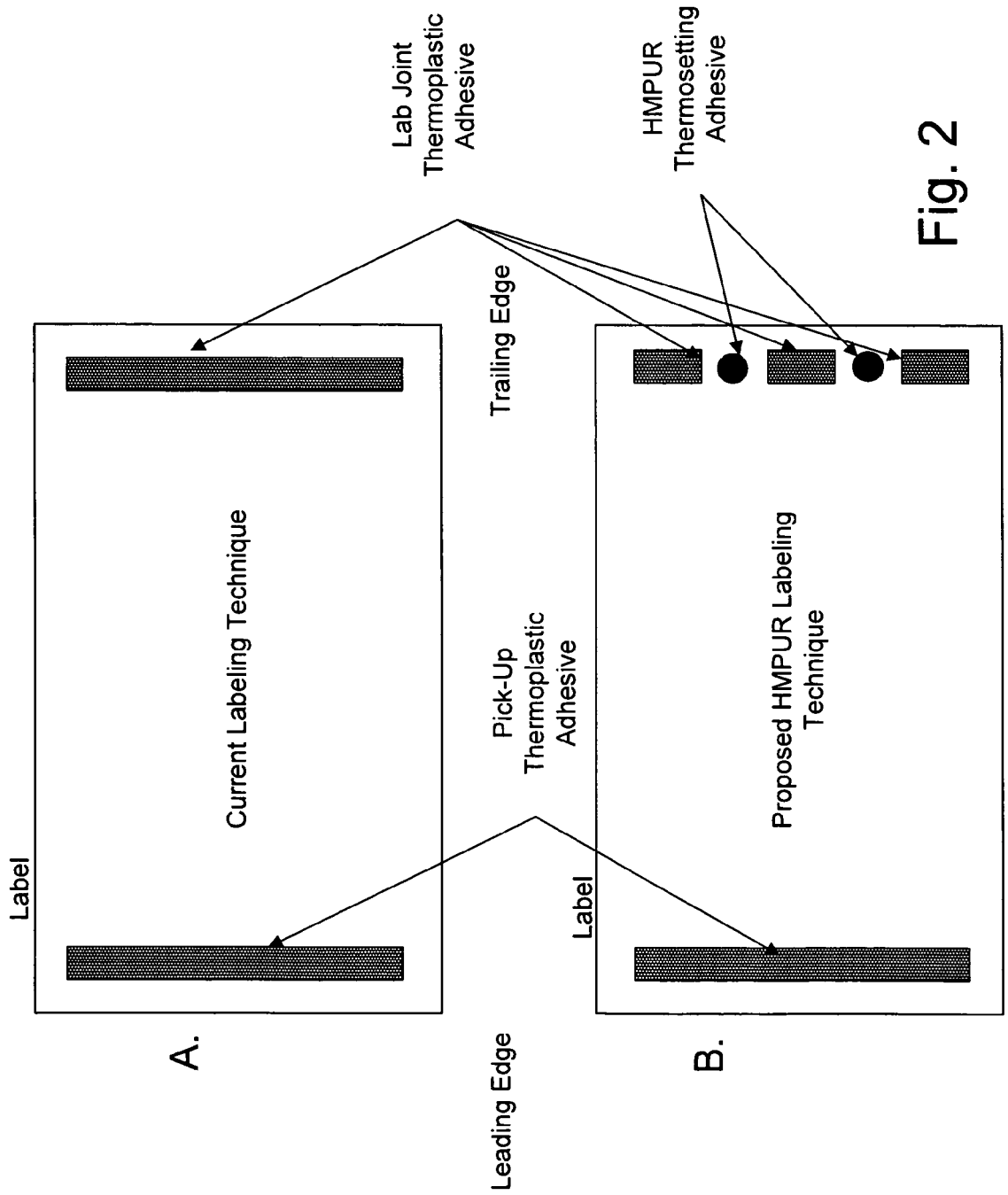
FIG. 2 is a diagram showing an alternative placement of thermosetting and thermoplastic adhesives on a label.

Adhesives may be applied to the edges of the label in many arrangements. A few of many adhesive arrangements are shown in FIGS. 1 and 2. One particular arrangement includes applying a thermoplastic adhesive to a portion of an edge of the label and also applying a thermosetting adhesive such as HMPUR to the same edge of the label. In a preferred aspect, the two types of adhesives are applied in a manner in which they do not come in contact with one another. This may occur by alternating the locations in which the adhesives are applied, or by applying the adhesives to different portions of the edge, as shown in FIGS. 1B and 2B. Small adhesive voids may be positioned at various locations on an edge, in between regions comprising thermoplastic adhesive, and these voids may be filled with HMPUR. 1, 2, 3, 4, 5 or more small adhesive voids may be present. FIG. 1B shows one small adhesive void filled by HMPUR and FIG. 2B shows two small adhesive voids filled by HMPUR. This creates an edge that will be fully bonded with either the other edge, or the container, depending on whether the leading edge or trailing edge is manufactured in this manner.

Another aspect involves the application of a conventional thermoplastic adhesive to a portion of the leading edge, which will provide adhesion to the container. The thermoplastic adhesive may also be applied to the trailing edge of the label in two regions, both being separated by a small ¼" adhesive void. The size of the small adhesive void may vary. For example, it may be ¹⁄₁₆", ⅛", ¼", ½", etc, depending on size constraints and adhesive requirements. Instead of applying a full strip of conventional hot-melt to the edge, the small adhesive void is created in the center of the glue pattern. This void may preferably be located approximately in the center of the edge glue pattern, as shown in FIG. 1B. However, the location and number of the adhesive void(s) may vary. The adhesive void may be filled with HMPUR.

Regardless of the location, or the amount of HMPUR applied to the edge of the label, the HMPUR cools and sets just like the conventional hot-melt adhesives. Upon reaction of the HMPUR to atmospheric moisture, the HMPUR undergoes a chain lengthening reaction that changes the physical state of the adhesive from a thermoplastic to a thermoset. This process may be referred to as curing. After approximately 3-5 days of curing, the HMPUR is fully cured and generally does not re-melt upon exposure to heat, even at temperatures of approximately greater than 300° F. This is especially useful if a labeled container is to be heated via rapid heating devices such as microwave ovens and similar radio-frequency type technologies. The HMPUR adhered label is less likely to be removed by the consumer.

Because the HMPUR adhesive generally is reactive to moisture, the adhesive should be applied using specialized equipment that does not expose the uncured adhesive to the atmosphere. The HMPUR may be supplied in a closed container, such as a sealed 5-gallon pail. The HMPUR may be melted and dispensed directly from the container. Application of the adhesive may be completed using typical hot-melt glue gun equipment as is well known in the art.

Once a label is affixed to a container via applying a thermoplastic hot-melt adhesive to the first edge and applying a thermoplastic hot-melt adhesive and a thermosetting adhesive to the second edge, the label can withstand heating. The addition of the thermosetting adhesive allows the label to stay affixed to the container even when the container is subject to heating.

Example 1

Four low viscosity (<5000 cPs) hot melt polyurethane reactive adhesives were evaluated to determine their machineability when dispensed through a typical air-open/air-closed (AO/AC) glue gun. The four formulations had viscosities ranging from 900 cPs to 4500 cPs. The physical properties for the four formulations are listed in Table 1.

TABLE 1

Hot Melt PUR Formulations Evaluated

| Example | Supplier | Formulation | Viscosity (cPs @ temperature) | Application Temperature (° F.) | Maximum Temperature (° F.) |
|---|---|---|---|---|---|
| 1 | National Starch | 91-001A | 900 @ 250° F. | 250 | 250 |
| 2 | National Starch | 91-7997 | 2500 @ 275° F. | 275 | 275 |
| 3 | Bostik | SG 1567-150 | 2900 @ 250° F. | 250 | 280 |
| 4 | H.B. Fuller | TL-0511 | 4500 @ 250° F. | 250 | 250 |

Of the four adhesives tested, the National Starch 91-001A formulation demonstrated the best machining characteristics with no observable stringing.

Example 2

All adhesive testing was completed using a Nordson BM20 melting unit equipped with standard ⁵⁄₁₆" transfer hoses. PUR test adhesives were supplied in 5-gallon pails, along with a 5-gallon pail of purge material from each supplier. The testing apparatus was set up so that the glue gun was fired onto a moving web of paper substrate. Web speed of the paper was variable from 0 to 300 feet per minute (fpm). Due to venting requirements, the glue gun was initially configured in the down-firing position.

For initial testing, a Nordson SUREBEAD™ reduced cavity needle/seat gun system was installed onto the test apparatus. It was theorized that the SUREBEAD™ would produce better adhesive cut-off due to the smaller amount of residual adhesive remaining in the reduced cavity configuration after actuation. The first adhesive to be evaluated was the National Starch 91-001A formulation. Initial test parameters for this adhesive are listed in Table 2.

TABLE 2

Machine Set-Up Parameters for Evaluation of National 91-001A Adhesive

| Parameter | Value |
|---|---|
| Platen Temperature | 250° F. |
| Transfer Hose Temperature | 250° F. |
| Gun Body Temperature | 250° F. |
| Glue Pump Pressure | 250 psi |

TABLE 2-continued

Machine Set-Up Parameters for Evaluation of National 91-001A Adhesive

| Parameter | Value |
| --- | --- |
| Glue Gun Assembly | SUREBEAD ™ AO/AC reduced cavity |
| Glue Nozzle (orifice and engagement) | 0.016", no engagement |

After the adhesive and glue gun were up to temperature, testing commenced. At a line speed of 300 fpm the SUREBEAD™ gun applied a ¼" bead with a small amount of stringing. While the glue stringing was relatively minor, it was significant enough to not be applicable for the application. Therefore, the SUREBEAD™ needle/seat gun was removed and replaced with a SOLIDBLUE™ ball/seat design. Temperatures and pressures were kept the same, and a 0.018"/0.050" engagement nozzle was fitted onto the tip. Once the SOLIDBLUE™ gun was up to temperature testing recommenced. At a full machine speed of 300 fpm, no stringing was observed while dispensing the National 91-001A PUR adhesive with a Nordson SOLIDBLUE™ gun. In order to observe for glue build-up on the tip, the machine was run for ~2 minutes at full speed, then the tip and substrate was observed. Once again, no stringing was seen and the glue tip was free from any build-up.

Example 3

Testing of the 91-001A formulation was concluded and the melter purged using National Starch 34-3180 PUR purge compound. After purging was complete, the melter was reloaded with the National 91-7997 formulation. The initial test parameters for the 91-7997 adhesive are shown in Table 3.

TABLE 3

Machine Set-Up Parameters for Evaluation of National 91-7997 Adhesive

| Parameter | Value |
| --- | --- |
| Platen Temperature | 275° F. |
| Transfer Hose Temperature | 275° F. |
| Gun Body Temperature | 275° F. |
| Glue Pump Pressure | 320 psi |
| Glue Gun Assembly | SOLIDBLUE ™ AO/AC |
| Glue Nozzle (orifice and engagement) | 0.018", 0.050" engagement |

Because the 91-7997 formulation was considerably higher in viscosity than the 91-001A formulation, the pump pressure was boosted from 250 psi to 320 psi. Initial testing showed that the 7997 adhesive possessed very little (if any) stringing. However, the adhesive did build up on the nozzle after 1-2 minutes of running. This build-up would grow in size until a large enough drop of glue would fall away from the nozzle, causing a streak on the web. In an attempt to eliminate this, pump pressure was increased to 400 psi, but the increased pressure did not have an effect on glue build-up.

The third adhesive tested was the H.B. Fuller TL-0511 formulation. This adhesive had a published viscosity of 4500 cPs at 250° F., making it the highest viscosity candidate.

Example 4

Table 4 shows the results of adhesive bond testing. Bond strength was obtained by using a tensile testing device equipped with a 2000 g load cell. Test labels were adhered to a 9 oz. steel water-filled can using an adhesive as discussed above. The labeled can was heated until the internal liquid temperature reached 140° F. At the same time, the surface of the metal container reached a temperature of 250° F. The bond strength of the adhesive was then tested.

The adhesives with a bond strength exceeding 400 g have a superior ability to withstand heating and have labels which are difficult for a consumer to remove. Table 4 shows that standard hot melt adhesives have bond strengths ranging from 67 g to 212 g. Most HMPUR adhesives have bond strengths above 400 g.

TABLE 4

| Adhesive | Bond Strength After Heating Liquid to 140° F. and Container to 250° F. | Adhesive Weight |
| --- | --- | --- |
| Henkel 362 Thermoplastic Adhesive Trial # 1 | 114 g | 0.18 |
| Henkel 362 Thermoplastic Adhesive Trial #2 | 67 g | 0.06 |
| Henkel 362 Thermoplastic Adhesive Trial #3 | 146 g | 0.22 |
| Henkel 362 Thermoplastic Adhesive Trial #4 | 155 g | 0.23 |
| Bostik SG1567 HMPUR Spot | 148 g | n/a |
| Henkel 362 Trial #4 - Heavy Glue Deposition | 212 g | 0.32 |
| NSC 91-7997 HMPUR Spot | 466 g | n/a |
| H.B. Fuller TL0511 HMPUR Spot | 474 g | n/a |
| NSC 91-001A HMPUR Spot | 580 g | n/a |

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein. All patents, patent applications, and references cited in this disclosure are expressly incorporated herein by reference.

What is claimed is:

1. A process of affixing a label to a container, wherein the label comprises a first edge and a second edge, comprising:
   i. applying a thermoplastic hot-melt adhesive to the first edge,
   ii. applying only a thermoplastic hot-melt adhesive to at least one first portion of the second edge and only a thermosetting adhesive to at least one second portion of the second edge, wherein the first portion and second portion do not contact each other, and
   iii. affixing the label to the container.

2. The process of claim 1 wherein the portion to which the thermoplastic hot-melt adhesive is applied is larger than the portion to which the thermosetting adhesive is applied.

3. The process of claim 1 wherein step (ii) further comprises applying the thermoplastic hot-melt adhesive in at least two separate locations of the second edge.

4. The process of claim 1 wherein the container is a can.

5. The process of claim 1 wherein the label is a heat stable label.

6. The process of claim 1 wherein the thermosetting adhesive is an HMPUR adhesive.

7. The process of claim 6 further comprising a step of curing the HMPUR adhesive.

8. The process of claim 1 wherein step (iii) further comprises wrapping the label around the container.

9. The process of claim 1 wherein step (iii) further comprises the adhesive of the first edge coming in direct contact with the container.

10. The process of claim 9 wherein the second edge lays on top of the first edge to form a lap joint.

11. The process of claim 1 wherein at least one small adhesive void is placed in between at least two portions of the thermoplastic hot melt adhesive.

12. The process of claim 11 wherein the adhesive void is about ¼ in size.

13. The process of claim 1 wherein the adhesives are applied with a open air glue gun.

14. The process of claim 3 wherein the thermosetting adhesive is applied to a small adhesive void.

15. A process of affixing a heat stable label to a container comprising:
   i. applying a thermoplastic hot-melt adhesive to at least one first portion of an edge of the heat stable label, and applying a thermosetting adhesive to at least a second portion of the edge of the heat stable label, wherein the first portion and second portion do not contact each other, and
   ii. affixing the label to the container.

16. The process of claim 15 wherein the label comprises a first edge and a second edge and wherein thermoplastic hot-melt adhesive is applied to both the first edge and the second edge and wherein the thermosetting adhesive is applied to the second edge.

17. The process of claim 16 further comprising applying the thermoplastic hot-melt adhesive in at least two separate locations of the second edge.

18. The process of claim 17 wherein the at least two separate locations are separated by a small adhesive void.

19. The process of claim 18 where the small adhesive void is filled with the thermosetting adhesive.

20. A process of affixing a label to a container, wherein the label comprises a first edge and a second edge, comprising:
   i. applying near the first edge of the label a narrow strip of thermoplastic hot-melt adhesive,
   ii. applying near the second edge of the label a narrow, discontinuous adhesive strip having one or more first portions spaced from one or more second portions said first portions containing only a thermoplastic hot-melt adhesive and one or more second portions containing only a thermosetting adhesive, wherein the remainder of the label is free of adhesive, and
   iii. affixing the label to the container.

* * * * *